United States Patent [19]
Takayuki

[11] Patent Number: 4,719,760
[45] Date of Patent: Jan. 19, 1988

[54] METHOD OF AND APPARATUS FOR FREEZING FOOD

[75] Inventor: Usui Takayuki, Kanazawa, Japan

[73] Assignee: Mitsui & Co., Ltd., Tokyo, Japan

[21] Appl. No.: 852,850

[22] PCT Filed: Aug. 1, 1985

[86] PCT No.: PCT/JP85/00436
§ 371 Date: May 14, 1986
§ 102(e) Date: May 14, 1986

[87] PCT Pub. No.: WO86/01081
PCT Pub. Date: Feb. 27, 1986

[30] Foreign Application Priority Data

Aug. 3, 1984 [JP] Japan .................. 59-163651
Aug. 3, 1984 [JP] Japan .................. 59-163652

[51] Int. Cl.⁴ .......................... F25D 13/04
[52] U.S. Cl. .......................... 62/65; 62/375; 62/380
[58] Field of Search ............ 62/65, 64, 63, 374, 62/380, 375; 165/146

[56] References Cited
U.S. PATENT DOCUMENTS 2,466,769  4/1949  Herold et al. ............. 165/146 X
3,455,120  7/1969  Schlemmer ................ 62/65 X
4,329,850  5/1982  Drummond ................ 62/64 X Primary Examiner—Henry A. Bennet
Attorney, Agent, or Firm—Wegner & Bretschneider

[57] ABSTRACT

Method of and apparatus for freezing food rapidly by immersing the same in the brine. According to the present invention, food is wrapped in a film which is non-permeable to water, and the resultant food is immersed in the fluidized brine of different temperatures in sequence. The food is frozen with little difference between the temperature of its outer circumferential portion and that of its core portion as the food is immersed in the fluidized brine of different temperatures in sequence. Accordingly, no cracks occur in the food while it is frozen, and no change occurs in the quality of protein in the core portion of the food.

11 Claims, 6 Drawing Figures

4,719,760

METHOD OF AND APPARATUS FOR FREEZING FOOD

FIELD OF THE INVENTION

The present invention relates to a method and apparatus for freezing food rapidly by immersing the same in brine, which is utilized in preservation of food.

BACKGROUND OF THE INVENTION

Food freezing is generally carried out by passing the food through the thermal zone where ice crystals of maximum diameter are formed so that the food is rapidly froze. That is, the food is rapidly passed through the thermal zone of 0° C.—−5° C. and the ice crystals of the frozen food are made smell in diameter, which avoids the cellular tissue and composition of the food being destroyed and which sufficiently suppresses the activity of microbes and enzymes.

The widespread methods of freezing food rapidly include use of a rapid freezing system such as a contact freezer, an air blast freezer etc., use of fluidized gas such as liquid nitrogen at the temperature of −80° C.—−90° C., immersion of the food in brine and the like. Among these methods, immersing the food in brine has the advantages of relatively low facility costs and capability of mass treatment on a continuous basis.

However, the studies of the inventors of the present invention show that the rapid freezing of the food is not sufficient to minimize the change in the quality of the food while the food is being frozen. The reason is as follows. Where the food is contacted with a fluidyzed gas such as liquid nitrogen, for freezing the same, the food id rapidly frozen, with a big difference between the temperature of its outer peripheral portion and that of its core portion occurring as the freezing of the food progresses. The result is that only the outer peripheral portion of the food is rapidly frozen so that cracks occur on the outer surface of the food and the free water contained in the core portion of the food is transferred by osmotic pressure to the outer portion thereof, causing an increase in the density of liquid in the core portion so that the biosynthetic cycle may be destroyed and a change in the quality of protein can occur. Thus, the food frozen under such conditions will not restore to the original micelle when it is thawed, resulting in the deterioration of the food.

On the other hand, in the food freezing system of the type using brine, a food-transfer conveyor disposed in the brine is utilized for immersing the foods in the brine continuously.

This type of system has rotary portions, some of which are exposed above the brine and are frozen by the same, and thus the conveyor is difficult to drive continuously. The conventional attempts in solving the problem include heating the rotary portion of the conveyor exposed above the brine by means of a heater and providing a heat-insulating layer (member) between the rotary portion and the remaining portion of the conveyor immersed in the brine. However, the former attempt increases the cost and the latter one is not sufficient to protect the rotary portion from freezing.

DISCLOSURE OF THE INVENTION

An object of the present invention is to provide a method for freezing food in which the food is immersed in brine and can be rapidly frozen with little difference between the temperature of its core portion and that of its outer peripheral portion.

Another object of the present invention is to provide an apparatus for freezing food by carrying out the above method. To accomplish the above object, in the method according to the present invention, the food is frozen by wrapping it in a film which is non-permeable to water and then passing the wrapped food through fluidized frine of sequentially different temperatures.

The apparatus according to the present invention has a conveyor arranged in a brine tank which transfers foods wrapped with a non-permeable film and phural nozzles disposed in the brine tank along the food passage defined by the conveyor which inject brine of different temperatures into the brine tank.

According to the method of the present invention, when the food wrapped with the waterproof film is passed through the brine of sequentially different temperatures, it is is frozen with little difference between the temperature of the outer perpheral portion and that of the core portion. Therefore, neither cracks nor a change in the quality of the protein in the frozen food occur, so that the deterioration of the quality of the food can be minimized. Further, according to the method of the present invention, the wrapped foods are immersed in the fluidized brine so that the effective freezing of the foods can be obtained.

According to the apparatus of the present invention, the conveyor transfers the foods through the fluidized brine of sequentially different temperatures, so that it is able to freeze a plurality of foods successively and effectively.

In a preferred embodiment of the present invention, the flow velocity of the brine is 1 to 3 m/s, preferably 1 to 1.2 m/s. According to the theoretical analysis, the freezing capacity obtained by immersion in brine having a temperature of −35° C. to −40° C. and the flow velocity of 1 to 1.2 m/s is equal to that obtained by blowing liquid nitrogen of −190° C. against the food at the velocity of 3 m/s. Thus, by passing the brine at a given velocity, a freezing effect can be attained substantially the same as that of liquid nitrogen. In addition, the foods are immersed in the brine of sequentially different temperatures so as to reduce the difference in temperature between the outer and the core portion of the food. Therefore, there are no cracks on the surface of the food or change in the quality of the protein in the core portion thereof, unlike when liquid nitrogen is used.

In another preferred embodiment, the temperature ranges of the brine are −35° C. to −40° C., −20° C. to −25° C., and −35° C. to −40° C. in order of the passage of the food. Where the thermal zones of these three types are formed along the passage of the food, the food wrapped with the waterproof film is at first immersed in a flowing brine of −35° C. to −40° C. to be rapidly cooled, and then in that of −20° C. to −25° C. to reduce the difference in temperature between the outer and the core portions thereof. After that, it is immersed in brine of −35° C. to −40° C. so as to become entirely flozen.

In addition, if the upper limit of the temperatures in the first and the last brines is highter than that of −35° C., sufficiently rapid freezing is not attained. On the contary, the lower limit of those temperatures is −40° C., below which cracks are likely to occur on the surface of the food and the free water is apt to transfer from the core portion to the outer portion so that a change in the quaility of the protein occurs. Furthermore, when the upper limit of the temperature in the middle brine zone is above −20° C., preferable rapid freezing is not obtained. Whereas the lower limit of this temperature is −25° C., below which increasing the difference in temperature between the outer and the core portions of the food increases. Strict boundaries are not required between the thermal zone of the brine, each of the thermal zones may gradually shift into the adjacent zone with a temperature gradient.

A preferable apparatus, which performs the different thermal zones of the brine as described above, has first, second and third nozzles arranged along the food passage defined by the conveyor, said first and third nozzles injecting brine of −35° C. to −40° C. and said second one injecting brine of −20° C. to −25° C. This type of apparatus is able to control the flow velocity of brine by adjusting the velocity of brine jet from each nozzle. Therefore, foods of different thermal capacity can be frozen by adjusting the brine jet velocity. Such adjustment is carried out by cotrolling the brine pressure applied to each nozzle through valve means. Furthermore, this type of apparatus is preferably provided with pressure regulating means comprising a porous plate disposed between the conveyor and each nozzle, in order to operate brine on each food transfered by the conveyor under equal pressure. Furthermore, the conveyor is preferably provided at its rotary portion exposing above the brine with brine injecting means which injects brine at the exposing portion so as to become its portion into a condition such as that in the brine. This results in prevention of the exposing portion from freezing.

In yet another preferred embodiment, the immersing time period of food in the brine sums up to 15 to 30 minutes. This period is adjustable by, for example, controlling the speed of the conveyor. Where the immersing period is less than 15 minutes, rapid freezing is required which becomes difficult to reduce the difference in temperature between the outer peripheral portion and the core portion of the food. On the contrary, the immersing period longer than 30 minutes results in excess freezing and decreases in freezing speed.

BRIEF DESCRIPTION OF DRAWINGS

Above and other advantages can easily be understood with reference to the accompanying drawings in which.

BEST MODE FOR CARRYING OUT THE INVENTION

Figure 1:
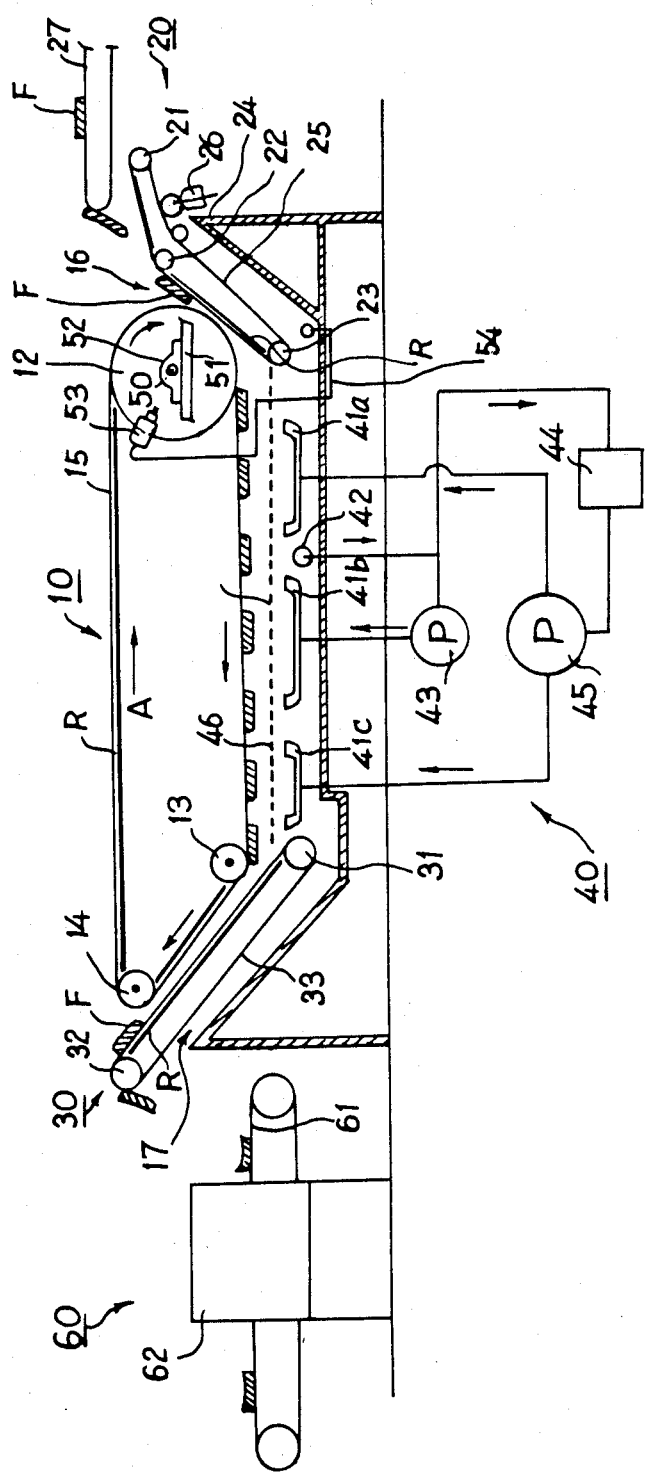
FIG. 1 is a diagramatic sectional view of an embodiment of a food freezing apparatus according to the present invention.
Figure 2:
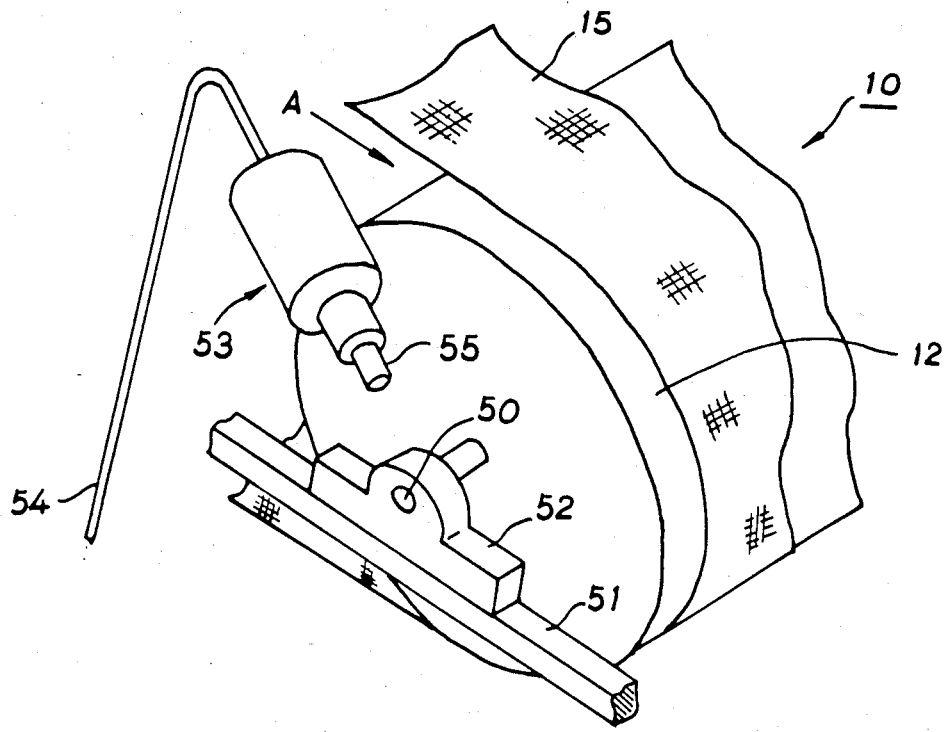
FIG. 2 is a perspective view showing the main portion of a brine injecting device according to the present invention.
Figure 3:
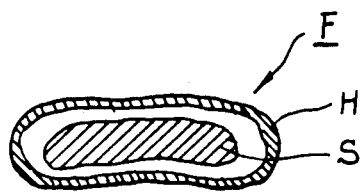
FIG. 3 is a sectional view of an example of food which is frozen by the apparatus shown in FIG. 1.

FIGS. 1 and 2 illustrate a preferred embodiment of the present invention which is suitable for freezing a food bag F as shown in FIG. 3 comprising a sealed bag H and a food S enclosed in the bag H with a little air.

As shown in FIG. 1, a brine tank 11 is provided with a main conveyor 10 and anxiliary conveyors 20 and 30 disposed respectively at an inlet and an outlet sides of the main conveyor 10 comprising a net belt 15 suspended between a main drum 12 and auxiliary drums 13, 14. The net belt 15 is immersed into the brine at its lower sunning zone defined by the main drum 12 and the auxiliary drum 13.

An arrow A shows the moving direction of the net belt 15.

The inlet-side conveyor 20 is comprised of a net belt 25 suspended between guide rollers 21 to 24 located at the front and the lower sides concerning to the main drum 12. When the food bags are not transferred, the net belt 25 is elastically contacted with the net belt 15 surrounding the main drum 12 and is driven in the same direction and at substantially equal speed as those of the net belt 15. A reference numeral 26 denotes a tension adjusting roller for the net belt 25.

Above the conveyor 20, there is provided a conveyor 27 for feeding food bags F which transfers the bag F to the entrance opening 16 and then drops the same therefrom onto the auxiliary conveyor 20.

The outlet-side conveyor 30 comprises a net belt 33 suspended between guide rollers 31 and 32, the center connecting line of which is parallel to that of the auxiliary drums 13 and 14. The guide roller 32 is located above the auxiliary drum 14 and outer side of the exit opening 17 of the brine tank 11, whereas the guide roller 31 is below the auxiliary drum 13. When the food bags are not transferred, the net belt 33 is elastically contacted with the net belt 15 as the net belt 25 of the conveyor 20, so that it is driven in the same direction and at a substantially equal speed as those of the net belt. The "net" of each net belt means that each belt is made of such members that they permit to pass the brine therethough.

Below the main conveyor 10 in the brine tank 11, there is provided a brine injecting device 40 which comprises three nozzles 41a, 41b and 41c located respectively at the entrance, the middle and the exit portions in the brine tank 11. The nozzle 41a and 41c inject the brine of about −35° C. to −40° C. and the nozzle 41b of about −20° C. to −25° C. Therefore, in the middle portion of brine tank 11, a suction part 42 is provided through which the brine is withdrawn from the tank and some of which is again injected into the tank 11 through the nozzle 41b by a pump 43, the remaining brine being passing through a cooling device 44 and then supplied to the nozzles 41a and 41c by a pump 45. Thus, the nozzles 41a, 41c are supplied with the brine cooled to about −35° C. to −40° C. by the cooling device 44, while the middle nozzle 416 is supplied with the heated brine after heat exchanging with the food bags F in the tank 11, so that the brine of −20° C. to −25° C. is injected into the tank through the nozzle 41b. In addition, the brine jet from each nozzle is adjusted at the speed of 1 to 1.2 m/sec.

Between these nozzles 41a–41c and the net belt 15 of the main conveyor 10, means 46 for regulating temperature and pressure is disposed which is formed from a porous plate. While the brine from each nozzle passes through apertures 47 of the plate 46, both pressure and temperature thereof are equalized. The plate 46 also has a function to maintain the difference in temperature of the brine between the adjacent nozzles.

The brine is used which can be cooled down to the above temperature and which must have the specific gravity to float the food bag F, such as a solution containing calcium chloride by weight of 30%. The food bag F, which is comprised of a sealed bag H and a food S enclosed in the bag H with a little air as shown in FIG. 3, is respected to float in the brine and attach to the lower surface of the net belt 15 so that it is transferred by the belt 15. If the buoyancy is not sufficient to froat the food bag, the net belt 15 may be provided with transfer plates on its lower surface which cooperate with the plate 46 to grip and transfer the food.

The main drum 12, the auxiliary drum 14, the guide rollers 21-24 and guide roller 32 are exposed above the brine in the brine tank 11, and the net belts 15, 24 and 33 undergo an immersion in and exposion from the brine repeatedly, which produces a danger that the rotary portions of the conveyor are frozen. Further, the net belt 15 moves along the guide rail R of the conveyor so that it may be attached to the rail R by freezing. To avoid the freezing, the brine is blown against the rotary portions or the relatively moving portions.

Exemplified the rotary portion of the main drum 12, the rotary axis 50 located at the center of the drum 12 is supported at both end by the side wal 51 of the tank 11 through bearing 52 against which a brine injecting device 53 blows the brine. The brine is supplied to the device 53 via a recirculating pipe 54 communicating with the bottom of the tank 11 and is blown against the bearings 52 through the nozzle 55 of the device 53.

At the outlet portion of the auxiliary conveyor 30, there is provided with a brine washing device 60 which comprises a washing conveyor 61 located below the conveyor 30 and a water-injecting tank 62 through which the conveyor 61 runs.

INDUSTRIAL APPLICABILITY

The apparatus having above-mentioned construction operates to freeze food as follows. The food bag F fed by the conveyor 27 falls on the upper surface of the net belt 25 of the auxiliary conveyor 20 through the entrance opening 16 of the brine tank 11. The food bag F on the conveyor 20 then goes into between the net belt 20 and the net belt 15 of the main conveyor 10 as the belt 20 progresses. These net belts 15, 20 cooperate to transfer the food bag F downward along the periphery of the drum 12 and immerse it into the brine of the brine tank 11. As mentioned above, the net belt 25 is driven in the same direction and at the same speed as those of the net belt 15, so that the food bag can be smoothly nipped between the net belts 15 and 25 and transferred along the periphery of the main drum 12. The food bag F reaches below the main drum 12 to be released between the belts 15 and 25, and then moves upwards to the lower surface of the net belt 15 by means of the buoyancy. The food bag F firmly attached on the lower surface of the belt 15 is transferred thereby toward the auxiliary drum 13.

During transferring through the freezing zone from the main drum 12 to the auxiliary drum 13, the food bag F is firstly frozen by the brine of $-35°$ C. to $-40°$ C. from the nozzle 41a, so that ice is formed rapidly about the food S in the film H and vat remaining in the food bag F is attached between the food S and the film H. With such excessively frozen condition, the food bag F is passing through the thermal zone defined by the brine of $-35°$ C. to $-40°$ C. where ice crystals of maximum diameter are formed. Secondly, the food bag F is frozen by the brine of $-20°$ C. to $-25°$ C. from the nozzle 41b to reduce the difference in temperature between the outer peripheral portion and the core portion of the food S and thereby to reduce the difference in the osmotic pressure between these portions. The food bag F is then exposed to the brine of $-35°$ C. to $-40°$ C. from the nozzle 41c so that it is rapidly frozen in its entirely and becomes instantaneously frozen. The freezing time for the above prosess depends on the nature and the size of the food S to be frozen, which is preferably determined between 15 minutes and 30 minutes. Since the speed of the brine injected from the nozzles 41a, 41b, 41c is 1 to 1.2 m/sec., the brine flows in the tank at a speed of about 1 to 1.2 m/sec., whereby the freezing capacity of the brine is improved. The plate 46 has the advantages to regulate the brine flow and to prevent the food bag F from being apart from the lower surface of the net belt 15 caused by irregular flow of the brine.

The food bag F, which has being frozen, is nipped between and transferred by the net belt 15 and the net belt 33 of the auxiliary conveyor 30, and then exsits out from the outlet opening 17 to drop downwardly from the guide roller 32 onto the washing coveyor 61 the brine washing device 60. Since the guide roller 31 of the auxiliary conveyor 30 is located below the auziliary drum 13 and the net belt is driven in the same direction and at the same speed as those of the net belt 15, the transfer of the food bag F from the lower surface of the net belt 15 to the place between the belt 15 and the net belt 33 can be carried out smoothly.

The food bag F on the conveyor 61 passes through the washig tank 62 to be washed the brine remaining on the outer surface of the film H. In the washing tank 62, the washing water of $18°$ C. to $23°$ C. is blown against the food bag F under 1 to 2 kg/cm$^2$ pressure for 1 to 3 seconds to remove the remaining brine from the film H substantially. The raise of the temperature of the food bag F is about $2°$ to $3°$ C. during the washing process, which does no affect to the freezing effectiveness.

On the other hand, during the above freezing process, the brine injecting device 53 is continously driven to blow the brine against the rotary portions exposed above the brine of the tank 11, which prevents these rotary portions from freezing. Referred to FIG. 2, the brine injecting device 53 has nozzles 55 which blow the brine against the bearings 52 of the main drum 12 of the conveyor 10. The brine is also coinuously supplied to the portion where the the net belts and the guide rail R are contacted with each other so that there is a danger of freezing. The brine itself is maitained in a fluidized condition so that the sufficient blow of the brine perform such a condition that the rotary portion would be immersed in the brine, and therefore the rotary portion will not freeze during the continuous operation.

The resulting food bag may be preserved in a refrigerator at a temperature of below $-18°$ C., for example. The preserving period is determined as requied and the food frozen by the present invention can be preserved for at least a year. And when the food is taken out from the refrigerator after proservation and is thawed, it will restore to the original micelle and the activity of emzymes therein will also recover. Therefore, the deterioration of the quality such as taste, color, smell etc. is very few.

An apparatus for exemplifying the method of this invention is not limited to that shown in FIG. 1. On the contrary, such apparatus can be used that the brine of different temperature is circulated in a brine tank. In the apparatus, food may be enclosed in a freezing pan made of stainless net etc. and immersed in a brine tank. After that, the brine is circulated in the brine tank with a temperature of the brine being changed as time passes, whereby the food in the brine tank can be frozen. An alternative apparatus can be used which is provided with phural brine tanks containing fluidized brine of different temperature, food being immersed in these tanks one by one so as to freeze.

Now, examples will be described wherein each food was frozen by the apparatus shown in FIG. 1 and then was preserved in a freezing condition for a given period.

(EXAMPLE 1)

Samples of boiled spaghetties, each weighting 250 g (containing 78% water), were packed in polyethylene bags. One bag (No. 1) was frozen by the apparatus of the present invention, one (No. 2) by blowing liquid nitrogen and the third (No. 3) by an air blast freezing apparatus. These samples were preserved in an atmosphere of −15° C. for a month and then their quality was examined. The results are shown in table 1 below. The change of temperature in each sample is shown in FIG. 3.

Table 1 shows that little change occured in the quality of sample No. 1 in conparison to the other ones. On the other hand, FIG. 3 shows that in the present apparatus, the temperature of the food fell to −15° C. and the freezing thereof had finished within about 15 min.

(EXAMPLE 2)

Figure 4:
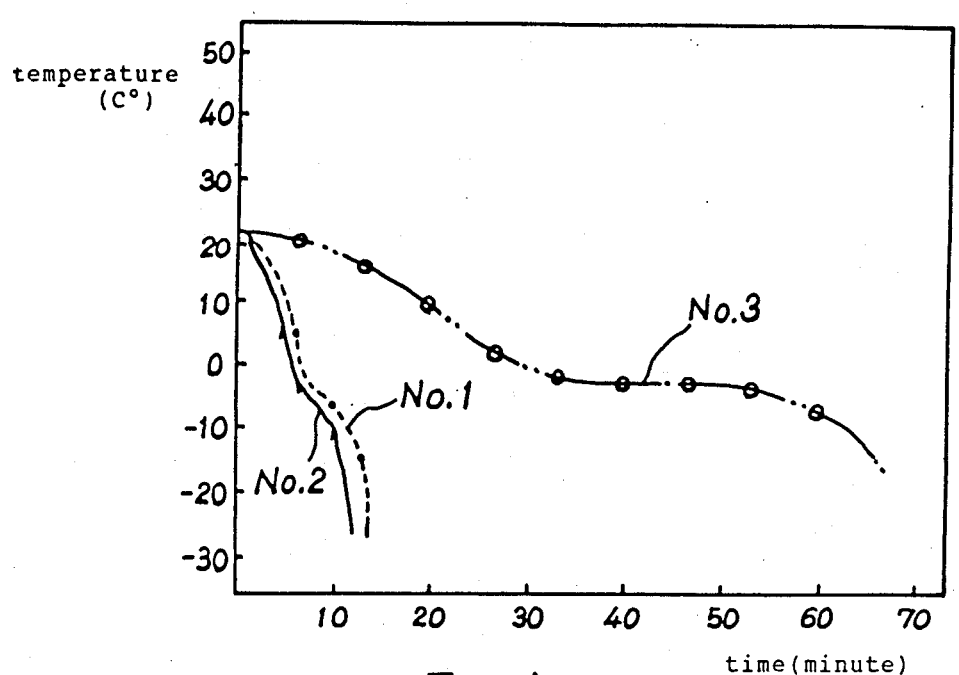
FIG. 4 is a graph showing the declination of the temperature where spagetties are frozen.

Samples of cuttlefish, each weighting 970 g (containing 80% water), were packed in polyethylene bags. One bag (No. 4) was frozen by the apparatus of this invention, one (No. 5) by blowing liquid nitrogen and the third (No. 6) by an air blast freezing apparatus. These samples were preserved in an atmosphere of −15° C. for a month and then their quality was examined. The results are shown in table 2 below. The change of temperature in each sample is shown in FIG. 4.

Table 2 shows that little change occured in the quality of sample No. 4 in comparison to the other ones. FIG. 4 shows that in the present apparatus, the temperature of the food fell to −15° C. and the freezing thereof has finished within about 27 min.

(EXAMPLE 3)

Figure 5:
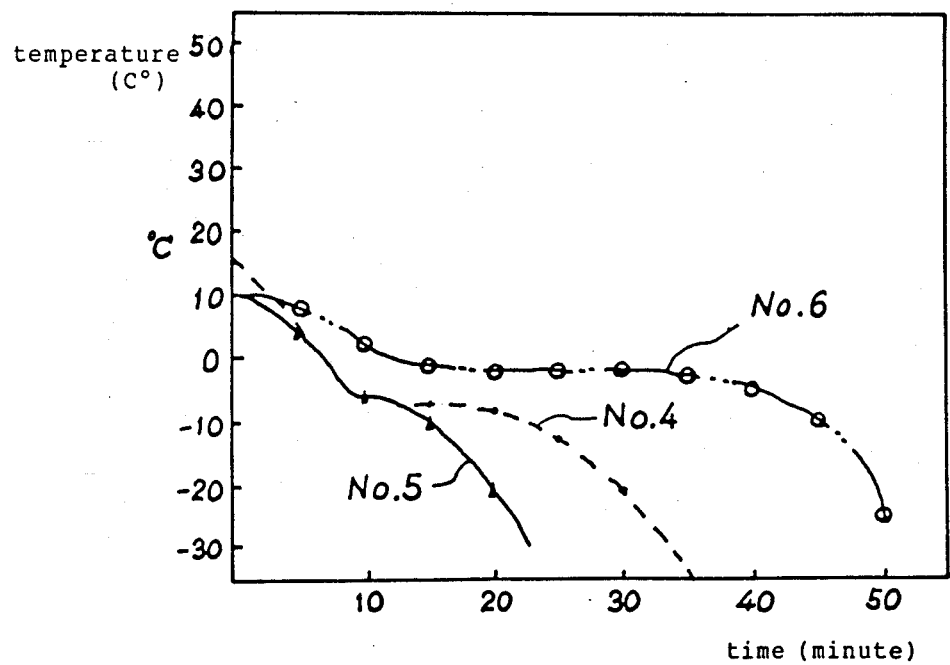
FIG. 5 is a graph showing the declination of the temperature where a cuttlefish is frozen.
Figure 6:
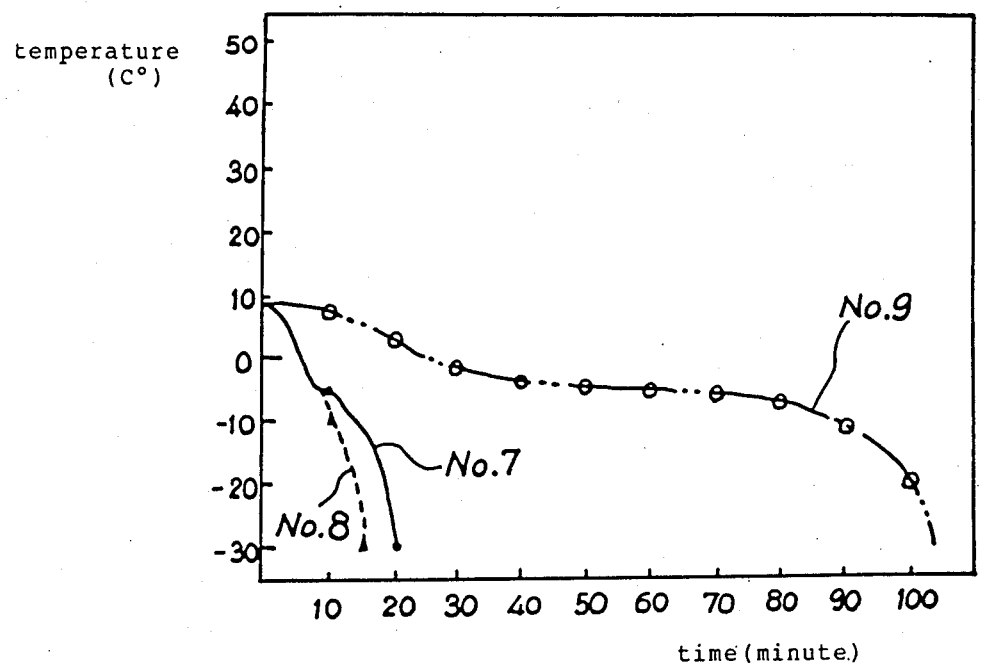
FIG. 6 is a graph showing the declination of the temperature where a bluefin is frozen.

Samples of bluefin, each weighting 290 g (containing 73.2% water), were packed in polyethylene bags. One bag (No. 7) was frozen by the apparatus of this invention, one (No. 8) by blowing liquid nitrogen and the third (No. 9) by an air blast freezing apparatus. These samples were preserved in an atmosphere of −15° C. for a month and then their quality was examined. The results are shown in table 3 below. The change of temperature in each sample is shown in FIG. 5.

Table 3 shows that little change occured in the quality of sample No. 7 in comparison to the other ones. FIG. 5 shows that in the present apparatus, the temperature of the food fell to −15° C. and the freezing thereof has finished within about 17 min.

The polyethylene bags used in each example were made of 0.03 to 0.05 mm thick polyethylene film.

TABLE 1

| Test Item | No. 1 | No. 2 | No. 3 |
| --- | --- | --- | --- |
| Taste | excellent and soft | excellent and soft uneven thawing was detected. | worse and softless |
| Drip Appearance | not detected fine | a little bit many cracks were detected. | a good many increase in roughness was found. |

TABLE 2

| Test Item | No. 4 | No. 5 | No. 6 |
| --- | --- | --- | --- |
| Taste | excellent | a little good | a little bad |
| Drip Quality | a little bit soft texture vaporization was not found. | a good many many cracks were detected | a good many increase in roughness was found. |

TABLE 3

| Test Item | No. 7 | No. 8 | No. 9 |
| --- | --- | --- | --- |
| Taste | good | a little bad | bad |
| Drip | a little bit | a good many | many |
| Color | fine | good | change in color was found. |

As described above, according to the present invention, food is wrapped with the waterproof film and immersed in the brine of seauqntially different temperatures, so that it can be frozen with little difference between the temperature of the outer peripheral portion and that of the core portion. Therefore, neither cracks nor a change in the quality of the protein in the frozen food occur, so that the deterioration of the quality of the food can be minimized. Further, the freezing effectively can be increased by flowing the brine.

I claim:

1. A method of freezing food comprising the steps of wrapping the food in a film which is non-permeable to water, immersing the wrapped food in flowing brine of sequentially different temperatures in order to freeze the wrapped food rapidly, reducing the difference in temperature between the outer peripheral portion and the core portion of said food, and thereafter completely freezing the food, the temperature of said brine being −35° to −40° C., −20° to −25° C., and −35° to −40° C. in the order of immersion.

2. The method of claim 1 wherein the flow velocity of said brine of 1 to 3 m/sec.

3. The method of claim 1 wherein the brine of −35° C. to −40° C. in which said wrapped food is immersed firstly has a flow velocity of 1 to 1.2 m/sec.

4. The method of claim 1 wherein the total time for immersing said wrapped food in the brine is 15 minutes to 30 minutes.

5. An apparatus for freezing food comprising a brine tank, a conveyor transferring food wrapped with a non-permeable film to water through the brine in said brine tank, a plurality of brine injecting nozzles disposed along the food passage defined by said conveyor so as to inject the brine of different temperature against said food passage, said nozzles being comprised of a first nozzle injecting the brine of −35° to −40° C., a second nozzle injecting the brine of −20° to −25° C. and third nozzle injecting the brine of −35° to −40° C., each nozzle suitable for being controlled independently from one another.

6. The apparatus of claim 5 wherein a porous plate for regulating the pressure of the brine is disposed between said conveyor and said nozzles.

7. The apparatus of claim 5 wherein the velocity of the brine injected from the nozzles is 1 to 3 m/sec.

8. The apparatus of claim 7 wherein the velocity of the brine injected from said first nozzle is 1 to 1.2 m/second.

9. The apparatus of claim 5 wherein the speed of said conveyor is determined so that the total time for immersing said wrapped food in said brine is 15 min. to 30 min.

10. The apparatus of claim 5 wherein said conveyor contains a main conveyor at least the lower running portion of which is immersed in said brine of the brine tank, an auxiliary conveyor disposed at the inlet side of said main conveyor which cooperates said main conveyor to grip said wrapped food therebetween at the inlet side of said main conveyor and transfer it into said brine and an auxiliary conveyor disposed at outlet side of said main conveyor which cooperates said main conveyor to grip said wrapped food therebetween at said outlet side and transfer it out of said brine, and brine injecting devices are provided with the rotary portions of said conveyors exposing above said brine which blow the brine against said rotary portrions.

11. The apparatus of claim 5 wherein a brine washing device is provided with said brine tank which washed said wrapped food to remove the remaining brine therefrom after said wrapped food is frozen and taken out from said brine.

* * * * *